United States Patent
Yamauchi et al.

(10) Patent No.: US 8,393,522 B2
(45) Date of Patent: Mar. 12, 2013

(54) JOINING METHOD AND JOINING TOOL

(75) Inventors: Ryo Yamauchi, Shizuoka-Ken (JP); Kentaro Kobari, Shizuoka-Ken (JP)

(73) Assignee: Suzuki Motor Corporation, Shizuoka-ken (JP)

(*) Notice: Subject to any disclaimer, the term of this patent is extended or adjusted under 35 U.S.C. 154(b) by 45 days.

(21) Appl. No.: 13/343,045

(22) Filed: Jan. 4, 2012

(65) Prior Publication Data
US 2012/0181324 A1 Jul. 19, 2012

(51) Int. Cl.
*B23K 20/12* (2006.01)

(52) U.S. Cl. ............... 228/112.1; 228/113; 228/114; 228/2.1

(58) Field of Classification Search .......... 228/112.1, 228/113, 114, 2.1
See application file for complete search history.

(56) References Cited

U.S. PATENT DOCUMENTS
2003/0098335 A1* 5/2003 Saeki et al. ............... 228/112.1

FOREIGN PATENT DOCUMENTS
JP 2003126973 5/2003
JP 2010071477 4/2010

* cited by examiner

*Primary Examiner* — Erin Saad
(74) *Attorney, Agent, or Firm* — Barnes & Thornburg LLP

(57) ABSTRACT

A joining method of a pair of workpieces, each workpiece having a non-flat portion and an abutting surface continuous to the non-flat portion, wherein the method provides an extension portion on each of the workpieces, the extension portion having a surface continuous with the non-flat portion and the abutting surface and projecting outward from the workpiece, and holding the workpieces so as to form a joining line between the non-flat portions of the respective workpieces by bringing the abutting surfaces thereof into contact with each other. Also disclosed is a joining tool having a substantially cylindrical shoulder portion and a projection projecting outward from a tip surface of the shoulder portion.

4 Claims, 7 Drawing Sheets

| FIRST SHOULDER PORTION DIAMETER D1 (mm) | SECOND SHOULDER PORTION DIAMETER D2 (mm) | PROJECTING WIDTH W (mm) | D2/W | W/D1 | RESULT |
|---|---|---|---|---|---|
| 10 | 30 | 11 | – | 1.10 | EXTENSIONS ARE DEFORMED DURING JOINING PROCESS |
| 10 | 30 | 12 | 2.50 | 1.20 | GOOD |
| 10 | 30 | 14 | 2.14 | 1.40 | GOOD |
| 10 | 30 | 16 | 1.88 | 1.60 | GOOD |
| 10 | 30 | 18 | 1.67 | 1.80 | MANY BURRS REMAIN DURING CUT-OUT |
| 10 | 40 | 20 | 2.00 | 2.00 | GOOD |
| 10 | 40 | 22 | 1.82 | 2.20 | GOOD |
| 10 | 40 | 24 | 1.67 | 2.40 | MANY BURRS REMAIN DURING CUT-OUT |
| 14 | 30 | 16 | – | 1.14 | EXTENSIONS ARE DEFORMED DURING JOINING PROCESS |
| 14 | 30 | 20 | 1.50 | 1.43 | MANY BURRS REMAIN DURING CUT-OUT |
| 14 | 35 | 20 | 1.75 | 1.43 | GOOD |
| 14 | 40 | 20 | 2.00 | 1.43 | GOOD |
| 14 | 50 | 20 | 2.50 | 1.43 | GOOD |
| 14 | 40 | 25 | 1.60 | 1.79 | MANY BURRS REMAIN DURING CUT-OUT |
| 14 | 45 | 25 | 1.80 | 1.79 | GOOD |
| 14 | 50 | 25 | 2.00 | 1.79 | GOOD |
| 14 | 65 | 25 | 2.60 | 1.79 | GOOD |

FIG. 8

JOINING METHOD AND JOINING TOOL

PRIORITY CLAIM

This patent application claims priority to Japanese Patent Application No. 2011-005863, filed 14 Jan. 2011, the disclosure of which is incorporated herein by reference in its entirety.

BACKGROUND

1. Field

Disclosed embodiments relate to a joining method and a joining tool for joining members (workpieces) to be joined.

2. Related Art

Recently, development and commercialization of friction-stir joining technology have been promoted as a new joining method to be replaced for welding and brazing methods which are joining methods for workpieces (members to be worked, i.e., joined) made of metal.

The friction-stir joining, which is solid-state joining, is suitable for joining workpieces at lower temperatures than welding (weld bonding) or brazing (liquid-solid-state bonding). Thus, the friction-stir joining has advantages of causing less thermal deformation to the workpieces during joining and being relatively free of joint defects resulting from gas defects or solidification cracking due to a state change of metal in a joined portion.

The friction-stir joining is a joining method which involves preparing a joining tool of a cylindrical shape, pressing the joining tool rotating at high speed against portions to be joined of workpieces, facilitating plastic flow of the junction by frictional heat generated between the joining tool and the workpieces (more specifically, portions to be joined), thus joining the workpieces.

The joining tool includes a shoulder portion and a projection called a probe, where the shoulder portion has a large outside diameter and uniform cylindrical shape while the projection has a small diameter and projects from a tip surface of the shoulder portion. The shoulder portion and projection are located substantially on the same axis. During the joining process, with the tip surface of the shoulder portion pressed against the workpieces and the probe pushed or plunged into a joint line between the workpieces, the joining tool moves along abutting surfaces of the workpieces. The workpieces then plasticize due to heat produced by the friction with the joining tool and become joined by flowing plastically while remaining in a solid phase.

The friction-stir joining is a joining method which involves pressing the joining tool against the workpieces with a relatively large force (hereinafter referred to as a "tool load"). For example, in the case of so-called 6000 (Al—Mg—Si) Series aluminum alloys, the tool load becomes as high as approximately 3 kN to 10 kN.

The friction-stir joining, however, provides a problem in that due to the need to apply the tool load to the workpieces and because of shape or geometry of the joining tool, it is difficult to join portions having complicated shapes such as curved shapes, rectangular shapes, or the like at an edge portions of the workpieces, i.e., joint portions having non-flat shapes. In addition, the friction-stir joining may provide a problem in that a probe pull-out hole is left in a jointed end portion.

To deal with the defects mentioned above, there is also provided a joining method which involves forming tabs or extension portions at end portions of the workpieces (more specifically, portions to be joined), performing friction-stir joining by utilizing the tabs or extension portions as a joint start portion or joint end portion, subsequently cutting off the tabs or extension portions by using another machine tool, thereby joining the joint portions of the workpieces having a non-flat shape without leaving a probe pull-out hole (for example, refer to Patent Document 1: Japanese Patent Laid-Open Publication No. 10-71477).

On the other hand, in the friction-stir joining method, there may cause a case in which, after passing through the junction of the workpieces, the joining tool might produce burrs on a surface of the joined portion. The burrs are undesirable in applications which require the surface of the junction to be smooth (e.g., an assembly in which the surface of the junction is used as a mating surface) or in applications which require an attractive appearance (e.g., an elaborately designed surface). Thus, there is also provided a friction-stir joining method which is capable of removing burrs from the surface of a junction concurrently with the friction-stir joining working using a joining tool equipped with a cutting blade adapted to rotate integrally with the joining tool (for example, refer to Patent Document 2: Japanese Patent Laid-Open Publication 2003-126973, in addition to Patent Document 1).

The conventional joining method which performs friction-stir joining using tabs or extension portions of the workpieces as the joining working start portion or joining working end portion need to cut off the tabs or extension portions using another machine tool after the joining. In this conventional method, because of the need to cut off the tabs or extension portions using another machine tool after the joining, compared to methods which do not need a process for cutting off tabs or extension portions, the conventional joining method requires additional time and labor, for example, to make a setup change from the joining apparatus to a cutting machine tool in order to cut off the tabs or extension portions, which may result in increasing in the cost of the joined product.

On the other hand, in the case of the friction-stir joining method capable of removing burrs from the surface of the junction concurrently with friction-stir joining working to the workpiece using a joining tool equipped with a cutting blade adapted to rotate integrally with the joining tool, although the method may provide a smooth junction, the method does not consider the necessity of cutting off the tabs or extension portions with the cutting blade when performing friction-stir joining using the tabs or extension portions of the workpieces as the joint working start portion or joint working end portion.

Moreover, since the friction-stir joining method cuts off burrs with the cutting blade, chips adhere to the workpieces or joined product, joining tool, and friction-stir joining apparatus, additional time and labor are then required for cleaning or other chip removal measures, leading to further increasing in the cost of the joined product.

SUMMARY

Disclosed embodiments provide a joining method and a joining tool capable of joining portions to be joined of workpieces having a non-flat shape without leaving a probe pull-out and without requiring additional time and labor for a setup change from a friction-stir joining apparatus to another machine tool.

One disclosed embodiment provides a joining method comprising: preparing a pair of workpieces to be joined together each of which has a non-flat portion and an abutting surface continuous to the non-flat portion; providing an extension portion on each of the workpieces, the extension portion having a surface continuous with the non-flat portion and the abutting surface and projecting outward from the workpiece; holding the workpieces so as to form a joining line between the non-flat portions of the respective workpieces by bringing the abutting surfaces thereof into contact with each other;

preparing a joining tool having a substantially cylindrical shoulder portion and a projection projecting outward from a tip surface of the shoulder portion and pressing the shoulder portion against the workpieces while rotating the joining tool so that the projection is positioned on the joining line; moving the rotating joining tool along the joining line until the joining tool reaches the extension portions; and separating the extension portions from the workpieces by pressing the joining tool against the extension portions with a force after the joining tool reaches the extension portions.

In the above joining method, although a pair of workpieces to be joined are prepared, the term "a pair of" does not mean a pair of ones having the same shapes and ones having portions to be joined together.

In one disclosed embodiment of the above aspect, it may be desired that the shoulder portion includes a substantially cylindrical first shoulder portion having the tip surface and a substantially cylindrical second shoulder portion located at a base end of the first shoulder portion and having a diameter larger than a diameter of the tip surface, the joining method further comprising: spacing the second shoulder portion away from the non-flat portions until the joining tool reaches the extension portions; and pressing the joining tool against the extension portions with a force after the joining tool reaches the extension portions to thereby press the second shoulder portion against a boundary between the workpieces and the extension portions. It may be also desired that the diameter of the second shoulder portion is equal to or more than 1.75 times a projecting width of the extension portions when the pair of workpieces are butted together.

It may be desired that a projecting width of the extension portions is equal to or more than 1.2 times the diameter of the tip surface when the pair of workpieces are butted together.

In another disclosed embodiment, there is also provided a joining tool for friction-stir joining, comprising: a substantially cylindrical first shoulder portion; a projection projecting outward from a tip surface of the first shoulder portion; and a substantially cylindrical second shoulder portion located at a base end of the first shoulder portion and having a diameter larger than a diameter of the tip surface.

In a further disclosed embodiment, there is also provided a joining tool for friction-stir joining of a pair of workpieces to be joined and extension portions serving as a joint end portion, comprising: a substantially cylindrical first shoulder portion having a tip surface to be pressed against the workpieces; a projection projecting outward from the tip surface of the first shoulder portion and adapted to be pushed into a joining line between abutting surfaces of the workpieces; and a second shoulder portion located at a base end of the first shoulder portion and having a diameter larger than a diameter of the tip surface, wherein the second shoulder portion is spaced away from the workpieces until reaching the joint end portion, and upon reaching the joint end portion, the second shoulder portion comes into contact with a boundary between the workpieces and the extension portions, and the extension portions is separated from the workpieces by applying a force stronger than a force with which the first shoulder portion is pressed against the workpieces.

According to the joining method and joining tool of the embodiments disclosed hereinabove, the joint portions of workpieces to be joined having a non-flat shape can be joined without leaving a pull-out of the probe and without requiring additional time and labor for a setup change from a friction-stir joining apparatus to another machine tool.

The nature and further characteristic features of the present invention will be made clearer from the following descriptions made with reference to the accompanying drawings.

BRIEF DESCRIPTION OF THE DRAWINGS

In the accompanying drawings:

FIG. 8 is a table representing results of a visual inspection of an appearance of a joined product from which extension portions are separated by the joining method according to disclosed embodiments.

DESCRIPTION OF THE DISCLOSED EMBODIMENTS

Disclosed embodiments will be described hereunder with reference to FIGS. 1 to 8.

Figure 1:
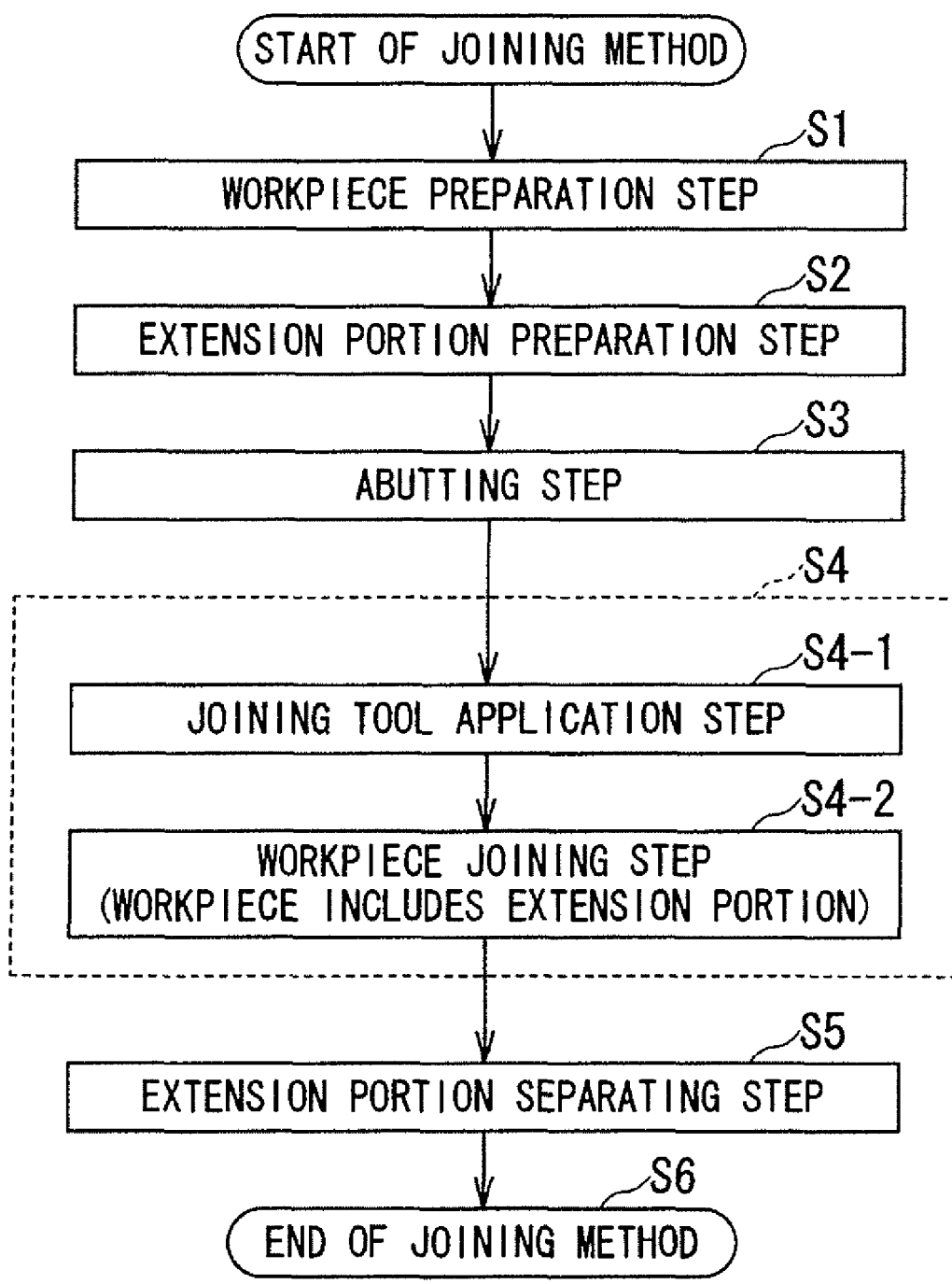
FIG. 1 is a flowchart showing a joining method according to disclosed embodiments.

FIG. 1 is a flowchart showing the joining method according to disclosed embodiments, and as shown in FIG. 1, the joining method according to disclosed embodiments includes a workpiece (members to be joined) preparation step S1, an extension portion preparation step S2, an abutting step S3, a friction-stir joining step S4, and an extension portion separating (or severing) step S5.

The workpiece preparation step S1 involves preparation of a pair of workpieces each of which has a non-flat portion and an abutting surface continuous to the non-flat portion.

The extension portion preparation step S2 involves a providing of an extension portion on each of the workpieces, the extension portion having a surface continuous to the non-flat portion and abutting surface of the workpiece and projecting from the workpiece.

The abutting step S3 involves a step of holding the workpieces so as to form a joint line between the non-flat portions by bringing the abutting surfaces of the workpieces into contact with each other, and during the holding step, the surfaces of the extension portions continuous with the abutting surfaces of the respective workpieces also come into contact with each other.

The friction-stir joining step S4 includes a joining tool application step S4-1 and a workpiece joining step S4-2. In the joining tool application step S4-1, a joining tool having a substantially cylindrical shoulder portion and a projection (which may be called projected portion, protruded portion or like) projecting from a tip end surface of the shoulder portion and presses, at the shoulder portion, against the workpieces while rotating the joining tool so that the projection is positioned on the joining (joint) line. In the workpiece joining step S4-2, the rotating joining tool is moved along the joint line until the joining tool reaches the extension portions. In the friction-stir joining step S4, the pair of workpieces plasticize due to heat produced by friction of the workpieces with the joining tool in surrounding areas (hereinafter referred to as "joint portions") of the abutting surfaces and become joined by flowing plastically while remaining in a solid phase.

The extension portion separating step S5 involves a step of separating the extension portions from the workpieces by pressing the joining tool against the extension portions with a stronger force after the joining tool reaches the extension portions.

Hereunder, the workpieces prepared in the workpiece preparation step S1 and the extension portions provided on the workpieces in the extension portion preparation step S2 will be described.

Figure 2:
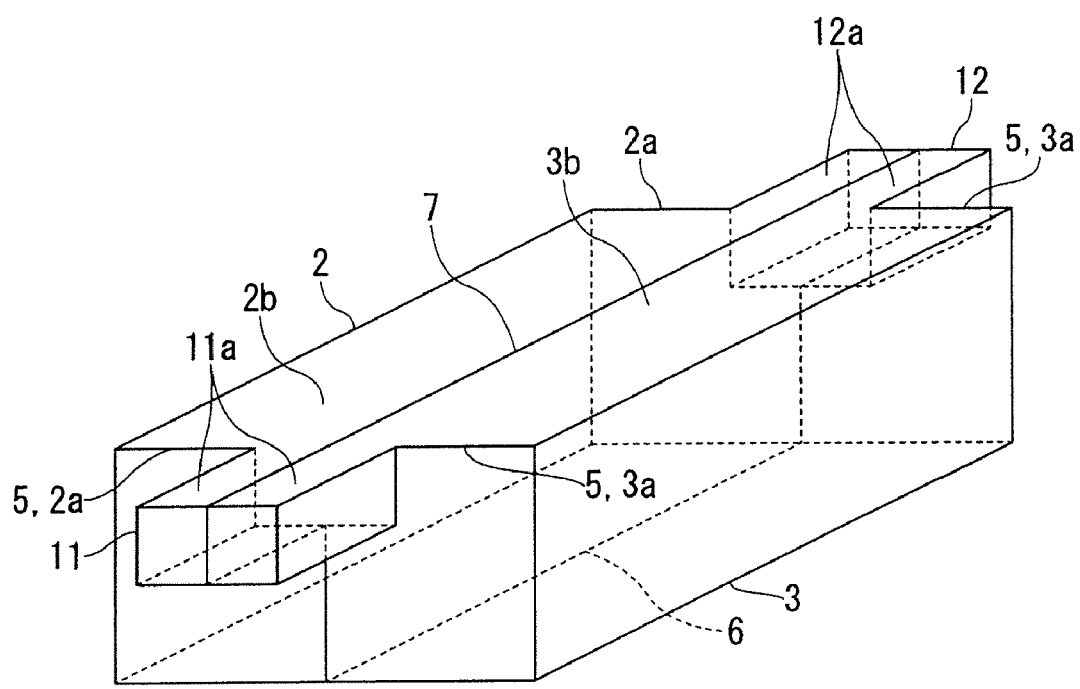
FIG. 2 is a perspective view showing an example of workpieces (members to be joined) joined by the joining method according to disclosed embodiments.

FIG. 2 is a perspective view showing an example of the workpieces joined by the joining method according to disclosed embodiments.

As shown in FIG. 2, each of a pair of workpieces 2 and 3 to be joined by the joining method according to disclosed embodiments has a non-flat portion 5 and an abutting surface 6 continuously joined to the non-flat portion 5.

The workpieces 2 and 3 are made of a material which is capable of subjecting the friction-stir joining such as an aluminum alloy, magnesium alloy, copper alloy, steel material or a metal matrix composite. The metal matrix composite is made up of a matrix metal such as aluminum, magnesium, titanium, or an alloy thereof; and a reinforcement material such as fibers or particles. The workpieces 2 and 3 may be made of the same material or different materials.

It is further to be noted that in FIG. 2, although a pair of workpieces to be joined are described with the same shape or outer configuration, the term "a pair of" used herein does not mean a pair of ones having the same shapes and means ones having portions to be joined together.

The non-flat portions 5 are corner portions 2a and 3a on edges of the workpieces 2 and 3. However, the non-flat portions 5 may be curved portions rather than the corner portions 2a and 3a. In such case, the non-flat portions 5 are curved portions on edges of the workpieces 2 and 3 with a radius of curvature of 20 mm or less. The workpieces 2 and 3 have respective flat surfaces 2b and 3b which are continuous to the non-flat portions 5 and suitable for the friction-stir joining.

The abutting surfaces 6 form a joint line 7 between the non-flat portions 5 when the workpieces 2 and 3 are brought into contact in the abutting step S3. An area or portion around the joint line 7 serve as joint portions which join the workpieces 2 and 3 by the friction-stir joining in the friction-stir joining step S4. Optionally, the abutting surfaces 6 are placed in close contact to each other with a minimal gap to prevent generation of defects in the joint portions.

The extension (extending or extended) portions 11 and 12 serve as a joining start portion or joining end portion in the friction-stir joining step S4. The extension portions 11 and 12 have surfaces continuous to the non-flat portions 5 and abutting surfaces 6 of the workpieces 2 and 3 and project from the workpieces 2 and 3. The extension portions 11 and 12 have flat surfaces 11a and 12a continuous to the flat surfaces 2b and 3b of the workpieces 2 and 3 for being suitable for the friction-stir joining. The extension portions 11 and 12 may be either formed integrally with the respective workpieces 2 and 3 during forming or formed independently as discrete parts and subsequently fixed to the workpieces 2 and 3 in the extension portion preparation step S2 by welding or another joining method or using a jig or the like.

The joining method according to disclosed embodiments allows the non-flat portions 5 of the workpieces 2 and 3 to be joined together in the friction-stir joining step S4 using the extension portions 11 and 12 as a joining start portion or joining end portion. Further, by separating or severing the extension portions 11 and 12 from the workpieces 2 and 3 in the extension portion separating step S5 after joining together the workpieces 2 and 3, the joining method according to disclosed embodiments can remove the pull-out hole of the joining tool.

Hereunder, the joining tool to be used in the friction-stir joining step S4 will be described.

Figure 3:
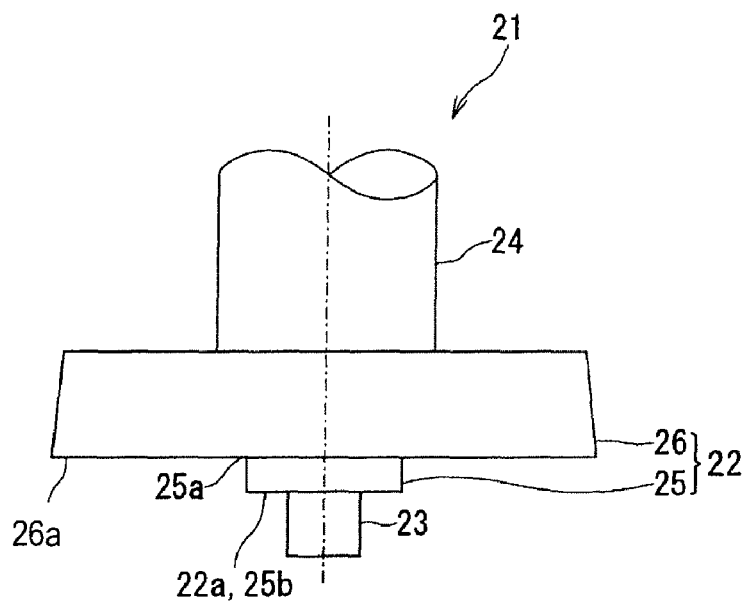
FIG. 3 is a diagram showing a joining tool according to disclosed embodiments.

FIG. 3 is an illustrated diagram showing the joining tool according to disclosed embodiments.

As shown in FIG. 3, the joining tool 21 is a friction-stir joining tool which is usable with a friction-stir joining apparatus, not shown, and is provided with a substantially cylindrical shoulder portion 22, a protruding (or protruded) portion 23 projecting from a front end surface (lower end surface in FIG. 3) 22a of the shoulder portion 22, and a shaft 24 connected to the friction-stir joining apparatus.

The shoulder portion 22 includes a substantially cylindrical first shoulder portion 25 and a substantially cylindrical second shoulder portion 26 located at a base end (upper end in FIG. 3) 25a of the first shoulder portion 25 and having a diameter larger than a diameter of the front end (lower end) surface 22a (i.e., a tip end surface 25b of the first shoulder portion 25).

The first shoulder portion 25 has a flat cylindrical shape with a substantially uniform diameter from the tip end surface 25b to the base end 25a.

Figure 4:
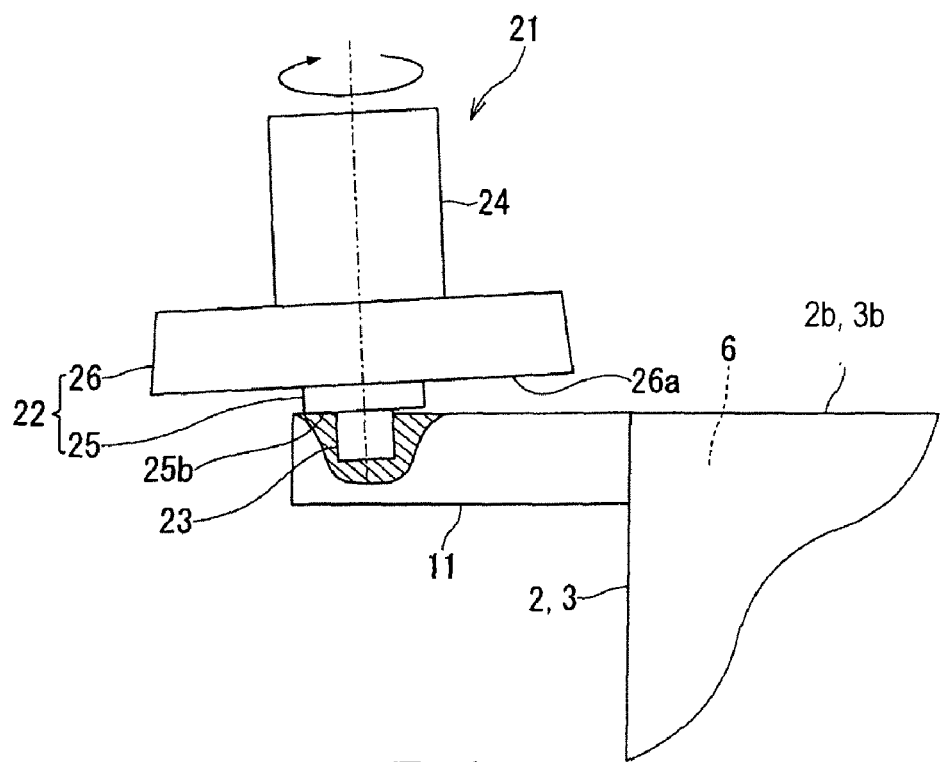
FIG. 4 is a side view showing how friction-stir joining is performed by the joining method according to disclosed embodiments by using the joining tool.

In the friction-stir joining step S4, the first shoulder portion 25 presses the rotating tip end surface 25b against the joint portions of the workpieces 2 and 3 and plasticizes the workpieces 2 and 3 by frictional heat to facilitate plastic flow while maintaining a solid phase (refer to FIG. 4).

The second shoulder portion 26 has a flat truncated conical shape in which the tip surface portion 26a has a maximum diameter tapering narrowly toward the base end side. In the friction-stir joining step S4, the second shoulder portion 26 is spaced away from the workpieces 2 and 3 until reaching the joint end portion. Upon reaching the joint end portion, in the extension portion separating step S5, the second shoulder portion 26 applies a force stronger than a force with which the first shoulder portion 25 is pressed against the workpieces 2 and 3, thereby generating frictional heat and plasticizing a boundary between the workpieces 2 and 3 and the extension portions 11 (or extension portions 12) to thereby facilitate the plastic flow while maintaining a solid phase, and the extension portions 11 (or extension portions 12) are then separated from the workpieces 2 and 3.

The projection 23 is a part called a probe, projecting from the tip surface 22a (i.e., the tip surface 25b) of the shoulder portion 22, and is provided with thread-like grooves, not shown. In the friction-stir joining step S4, the projection 23 is rotated and plunged into the joining portion of the abutting surfaces 6 of the workpieces 2 and 3, and the workpieces 2 and 3 are plasticized by the frictional heat to facilitate plastic flow while maintaining a solid phase.

Next, the friction-stir joining processing in the friction-stir joining step S4 will be described with reference to FIG. 4 which illustrating a way how friction-stir joining is performed by the joining method according to disclosed embodiments.

As shown in FIG. 4, in the friction-stir joining step S4 of the joining method, the joining tool (21) application step S4-1 is first carried out in the following manner.

That is, the joining tool 21 starts rotating at a location spaced away from the workpieces 2 and 3 or the extension portions 11 and 12, the rotating joining tool 21 is pressed against the extension portions 11 serving as a joint start portion, the projecting portion 23 is pushed into the abutting surfaces 6 to be joined, and the tip end surface 25b of the first shoulder portion 25 is pressed against the joint portions of the workpieces 2 and 3. According to this manner, tip end surface 26a of the second shoulder portion 26 is spaced away from the flat surfaces 2b and 3b of the workpieces 2 and 3.

Figure 5:
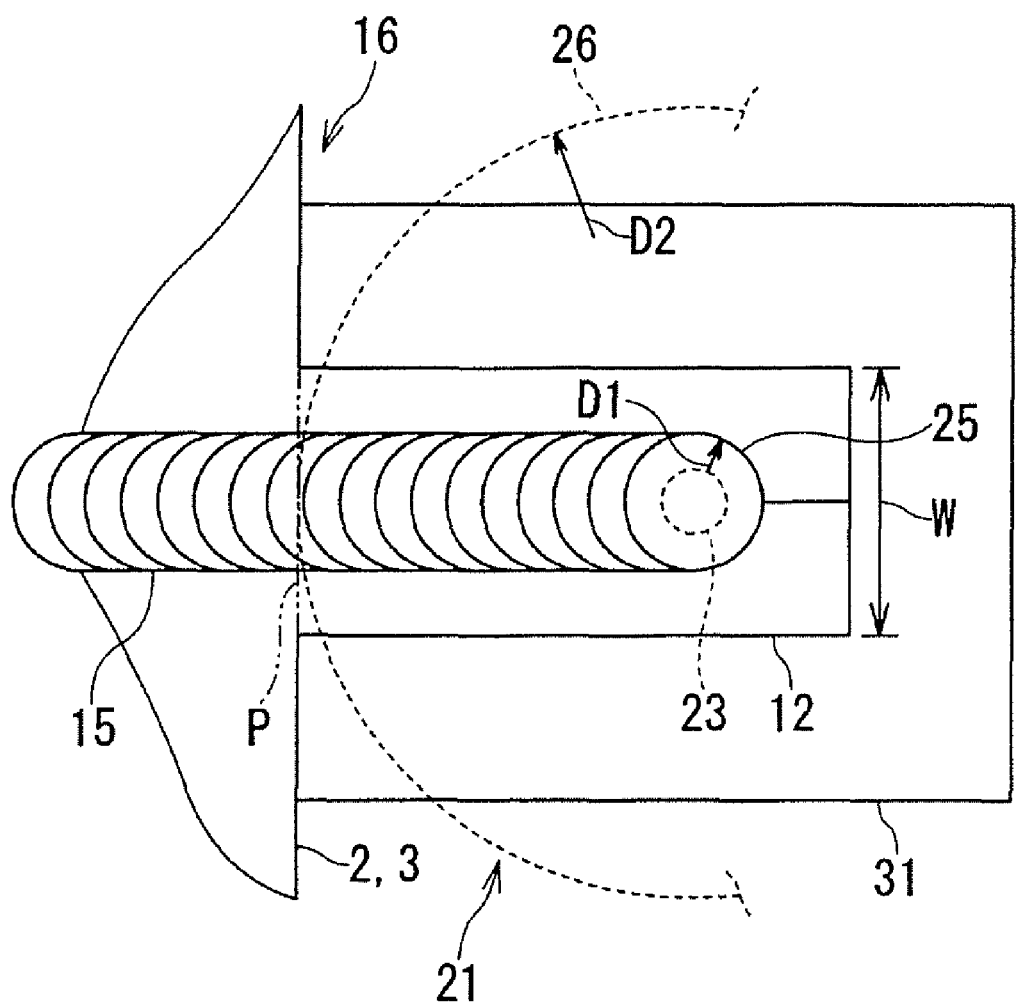
FIG. 5 is a plan view showing how friction-stir joining is performed by the joining method according to disclosed embodiments.
Figure 6:
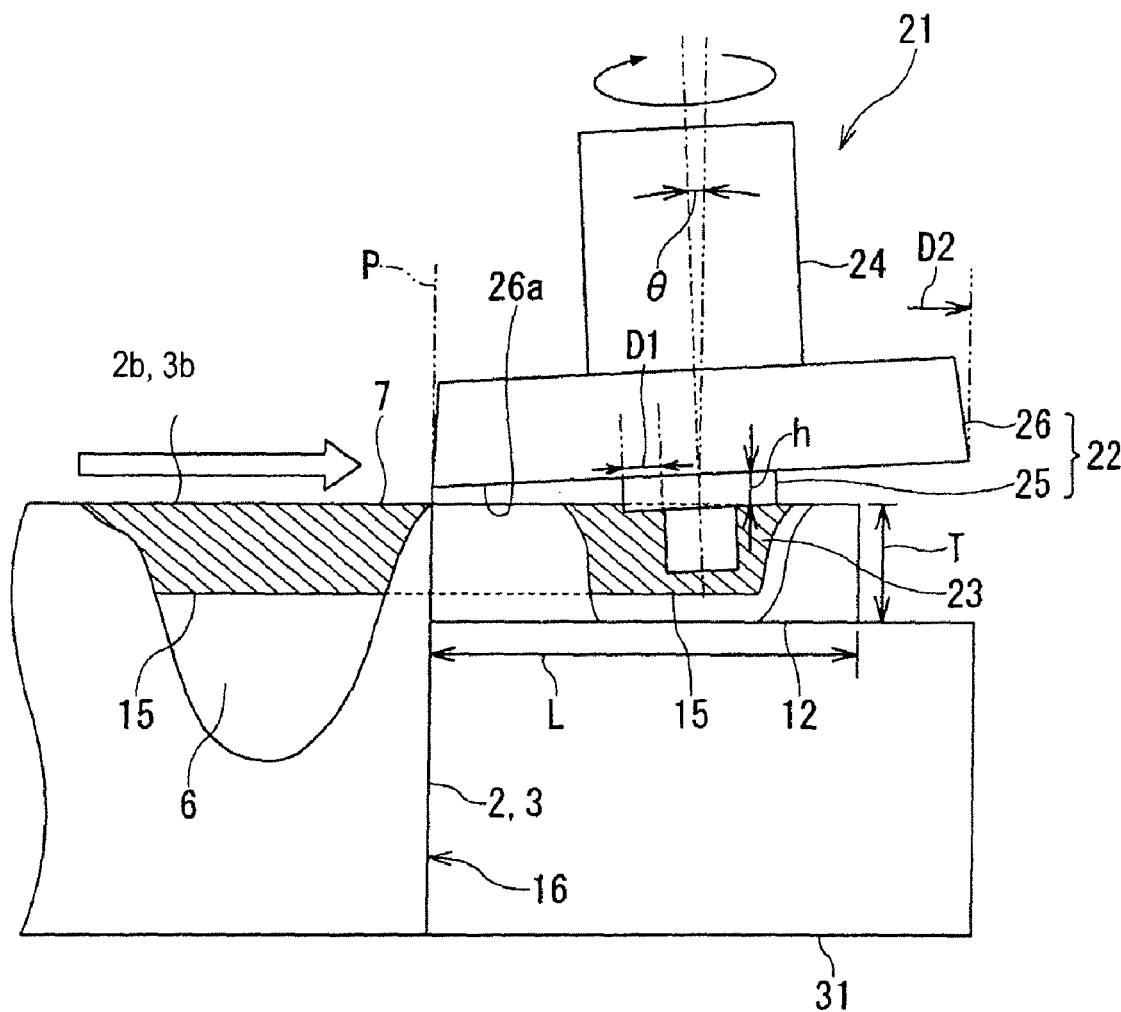
FIG. 6 is a side view showing how friction-stir joining is performed by the joining method according to disclosed embodiments.

FIG. 5 is a plan view showing a way how the friction-stir joining is performed by the joining method according to disclosed embodiments, and FIG. 6 is a side view thereof.

As shown in FIGS. 5 and 6, in the friction-stir joining step S4 is a step of joining the workpieces 2 and 3 using the friction-stir joining apparatus, and the workpiece joining step S4-2 is carried out after the joining tool application step S4-1 in the following manner. That is, the rotating joining tool 21 is moved (fed) along the joint line 7 until reaching the extension portions 12 formed the joint end portion. As the portions of workpieces 2 and 3 to be joined flow plastically while being plasticized due to heat of friction with the joining tool 21 but remaining in a solid phase, and formed as a friction-stir joint 15, thereby forming the workpieces 2 and 3 as a joined product 16.

In such step as mentioned above, the joining tool 21 advances into the extension portions 12 in a manner such that an edge of the tip surface 26a of the second shoulder portion 26 almost completely overlap a boundary line P between the joined product 16 and extension portions 12.

Further, in the above processing, diameter D2 of the tip surface 26a of the second shoulder portion 26 and the height h of the first shoulder portion 25 in a rotation axis direction are set, by taking into consideration a lead angle θ between a rotation axis of the joining tool 21 and a normal line to the flat surfaces 2b and 3b of the workpieces 2 and 3, in a manner such that the second shoulder portion 26 will be spaced away from the workpieces 2 and 3 until reaching the joint end portion in the friction-stir joining step S4, and will be brought into contact with the boundary, i.e., the boundary line P, between the workpieces 2 and 3 and the extension portions 11 (or extension portions 12) in the extension portion separating step S5 by applying a force stronger than a force with which the first shoulder portion 25 is pressed against the workpieces 2 and 3.

In the joining of the extension portions 11 or 12 by friction-stir joining, a jig 31 may be placed across the extension portions 12 from the joining tool 21 to receive the force (so-called tool load) pressing the joining tool 21. In such case, the jig 31 is removed before the start of the extension portion separating step S5.

Hereunder, the extension portion separating (severing) step S5 will be described.

Figure 7:
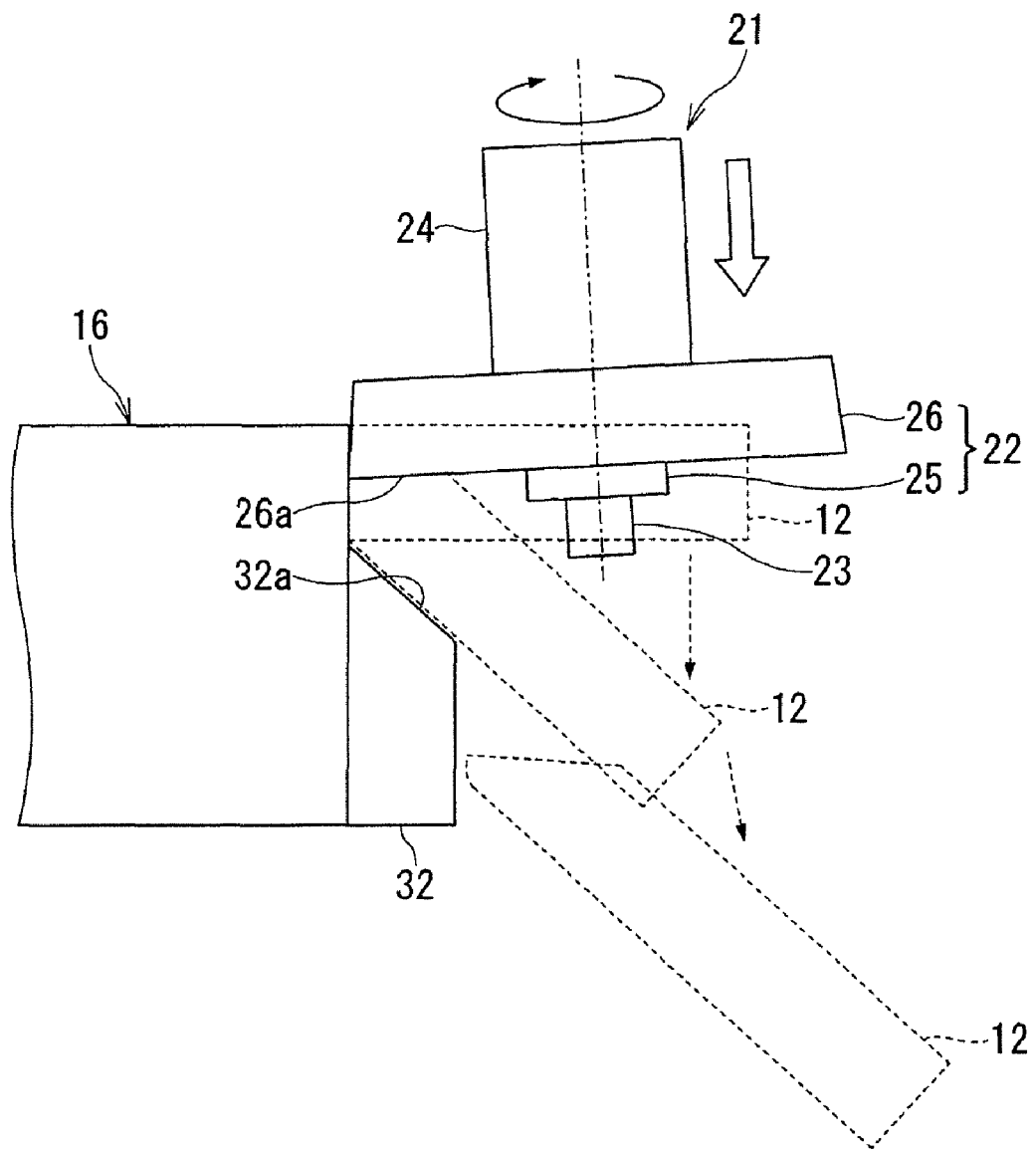
FIG. 7 is a side view showing how extension portions are separated by the joining method according to disclosed embodiments.

FIG. 7 is a side view showing a way how the extension portions are separated by the joining method according to disclosed embodiments.

As shown in FIG. 7, the extension portion separating step S5 of the joining method according to disclosed embodiments includes the separating process of the extension portions 12 from the workpieces 2 and 3 using the friction-stir joining apparatus. Specifically, after the joining tool 21 reaches the extension portions 12, the joining tool 21 severs the extension portions 12 from the workpieces 2 and 3 by being pressed against the extension portions 12 with a strong force. That is, the extension portion separating step S5 is carried out after the completion of the friction-stir joining step S4 so as to separate the extension portions 12 using the second shoulder portion 26 by lowering the joining tool 21 substantially vertically toward a joint surface while maintaining feed position of the joining tool 21.

Then, the extension portions 12 are plasticized by the heat of friction with the second shoulder portion 26 and separated from the workpieces 2 and 3 (broken line arrows in FIG. 7) by flowing plastically while remaining in a massive form. The pull-out hole of the projection 23 left in the joint end portion by the friction-stir joining is separated from the workpieces 2 and 3 together with the extension portions 12, and is not left in the joined product 16. In this step, the rotational speed of the joining tool 21 may differ from the rotational speed used during the friction-stir joining process in the friction-stir joining step S4. The friction-stir joining step S4 and the extension portion separating step S5 may be carried out continuously with the rotation of the joining tool 21 maintained or the rotation of the joining tool 21 may be stopped once by removing the joining tool 21 from the extension portions 12.

Further, in the extension portion separating step S5, the extension portions 11 may be severed from the workpieces 2 and 3, before or after the separating of the extension portions 12, by returning the feed position of the joining tool 21 to the joining start portion.

To separate the extension portions 12, a cutting jig 32 may be placed across the extension portions 12 from the joining tool 21. The cutting jig 32 has the shape of a wedge having a base end located on the boundary line P between the workpieces 2 and 3 and extension portions 12 and has a slope 32a which faces the joining tool 21.

A concrete example of the joining method according to disclosed embodiments will be described hereunder in more detail, in which shapes and sizes of components are based on the illustrations of FIGS. 5 and 6.

The workpieces 2 and 3 and extension portions 11 and 12 were made of an aluminum alloy (JIS H 4040: A6061) and formed integrally by machining working. The workpieces 2 and 3 had the corner portions 2a and 3a as the non-flat portions 5.

When workpieces 2 and 3 were butted together, the extension portions 11 and 12 had a projecting width W of approximately 11 mm to 25 mm, a projecting length L of approximately 40 mm, and a plate thickness of approximately 20 mm. When the extension portions 11 and 12 were joined by the friction-stir joining, the jig 31 was placed to receive the force pressing the joining tool 21.

The used joining tool 21 was made of alloy tool steel member (JIS G 4404: SKD61) and structured in the following manner. That is, the projection 23 has a diameter of approximately 6 mm and a projection length of approximately 6 mm, the tip surface 25b of the first shoulder portion 25 has a diameter D1 of approximately 10 mm, and the tip surface 26a of the second shoulder portion 26 has a diameter D2 of approximately 30 mm to 40 mm. Another used joining tool 21 was structured as follows. That is, the projection 23 has a diameter of approximately 6 mm and a projection length of approximately 6 mm, the tip surface 25b of the first shoulder portion 25 has a diameter D1 of approximately 14 mm, and the tip surface 26a of the second shoulder portion 26 has a diameter D2 of approximately 30 mm to 65 mm.

In the extension portion separating step S5, the joining tools 21 were used under the following conditions.

The rotational speed is approximately 800 rpm and the feed rate is approximately 150 mm/minute.

FIG. 8 is a diagram showing the results of a visual inspection on the portions of a joined product from which extension portions were separated (severed) by the joining method according to disclosed embodiments.

As shown in FIG. 8, a cut surface of the joined product 16 from which the extension portions 11 or extension portions 12 were separated showed an almost burr-free good appearance under a condition in which the diameter D2 of the second shoulder portion 26 is equal to or more than 1.75 times the projection width W of the extension portions 11 and 12.

The extension portions 11 as well as the extension portions 12 can be joined properly in the friction-stir joining step S4 under the condition in which the projection width W of the extension portions 11 and 12 is equal to or more than 1.2 times the diameter D1 of the tip surface 25b of the first shoulder portion 25, but cannot be joined properly and separated from each other during the friction-stir joining process if the projection width W is smaller than that value.

In the separating step of the extension portions 12, it was found that the use of the cutting jig 32 provided a good cut surface between the workpieces 2 and 3 and extension portions 12 because of the reduction of a generation area of a fracture surface on the cut surface.

The joining method according to disclosed embodiments can perform the friction-stir joining of the workpieces 2 and 3 and separate the extension portions 11 and 12 as a series of steps on the friction-stir joining apparatus.

More specifically, by performing the friction-stir joining process to the workpieces 2 and 3 by utilizing the first shoulder portion 25 and projection 23 of the joining tool 21 and then separating the extension portions 11 and 12 from the workpieces 2 and 3 by using the second shoulder portion 26 of the joining tool 21, the joining method according to disclosed embodiments can perform the friction-stir joining step S4 and the extension portion separating step S5 as a series of steps. That is, according to the joining method of disclosed embodiments, the joined product 16 can be produced by joining the non-flat portions 5 of the workpieces 2 and 3, and moreover, the friction-stir joining process by using the extension portions 11 and 12 can reduce the setup changes between machine tools and eliminate additional time and labor, thereby preventing the increases in the cost of the production of the joined product 16 without requiring another machine tool other than the friction-stir joining apparatus for separating or severing the extension portions 11 and 12.

Furthermore, when the extension portions 11 and 12 is separated from the workpieces 2 and 3, the joining method of disclosed embodiments can separate the extension portions 11 and 12 in a massive form by plasticizing the extension portions 11 and 12 by the application of the heat produced by the friction with the second shoulder portion 26. Therefore, the joining method of disclosed embodiments can prevent adhesion of chips to the workpieces 2 and 3 or joined product 16, the joining tool 21, and the friction-stir joining apparatus, and hence, eliminate the need for additional time and labor for cleaning or other chip removal measures, thereby preventing further increases in the cost of the production of the joined product 16.

Furthermore, since the extension portions 11 and 12 remain in a massive form even after being separated, the joining method according to disclosed embodiments makes it easy to recover and reuse the extension portions 11 and 12.

Still furthermore, according to the joining method of disclosed embodiments, the extension portion separating step S5 is performed following the friction-stir joining step S4 while the joining tool 21 continues rotating. Therefore, the joining tool 21 and the extension portions 12 serving as a joint end portion can be heated, while keeping high temperatures, by additionally applying the heat produced by the friction with the second shoulder portion 26, thereby causing plastic flow of the extension portions 12 to occur easily and allowing the extension portions 12 to be separated more properly.

Further, according to the joining method according to disclosed embodiments, since the extension portions 12 is pushed out along the slope 32a in a direction away from the workpieces 2 and 3 using the cutting jig 32, the extension portions 12 can be separated more properly.

Thus, according to the joining method and the joining tool 21 of disclosed embodiments, the joint portions of the workpieces 2 and 3 having the non-flat portions 5 can be joined without requiring additional time and labor for a setup change from the friction-stir joining apparatus to another machine tool, thus being advantageous.

It is further to be noted that the present invention is not limited to the disclosed embodiments, and many other changes and modifications may be made without departing from the scopes of the appended claims.

What is claimed is:

1. A joining method comprising:
preparing a pair of workpieces to be joined together each of which has a non-flat portion and an abutting surface continuous to the non-flat portion;
providing an extension portion on each of the workpieces, the extension portion having a surface continuous with the non-flat portion and the abutting surface and projecting outward from the workpiece;
holding the workpieces so as to form a joining line between the extension portions of the and between the pair of workpieces by bringing the abutting surfaces thereof into contact with each other;
preparing a joining tool having a substantially cylindrical shoulder portion and a projection projecting outward from a tip surface of the shoulder portion and pressing the shoulder portion against the workpieces while rotating the joining tool so that the projection is positioned on the joining line;
moving the rotating joining tool along the joining line until the joining tool reaches the extension portions; and
separating the extension portions from the workpieces by pressing the joining tool against the extension portions with a force after the joining tool reaches the extension portions.

2. The joining method according to claim 1, wherein the shoulder portion includes a substantially cylindrical first shoulder portion having the tip surface and a substantially cylindrical second shoulder portion located at a base end of the first shoulder portion and having a diameter larger than a diameter of the tip surface, the joining method further comprising: spacing the second shoulder portion away from the non-flat portions until the joining tool reaches the extension portions; and pressing the joining tool against the extension portions with a force after the joining tool reaches the extension portions to thereby press the second shoulder portion against a boundary between the workpieces and the extension portions.

3. The joining method according to claim 2, wherein the diameter of the second shoulder portion is equal to or more than 1.75 times a projecting width of the extension portions when the pair of workpieces are butted together.

4. The joining method according to claim 1, wherein a projecting width of the extension portions is equal to or more than 1.2 times the diameter of the tip surface when the pair of workpieces are butted together.

* * * * *